J. N. ATTERBURY.
POTATO SEPARATOR.
APPLICATION FILED AUG. 22, 1914.
1,226,441.
Patented May 15, 1917.
3 SHEETS—SHEET 1.
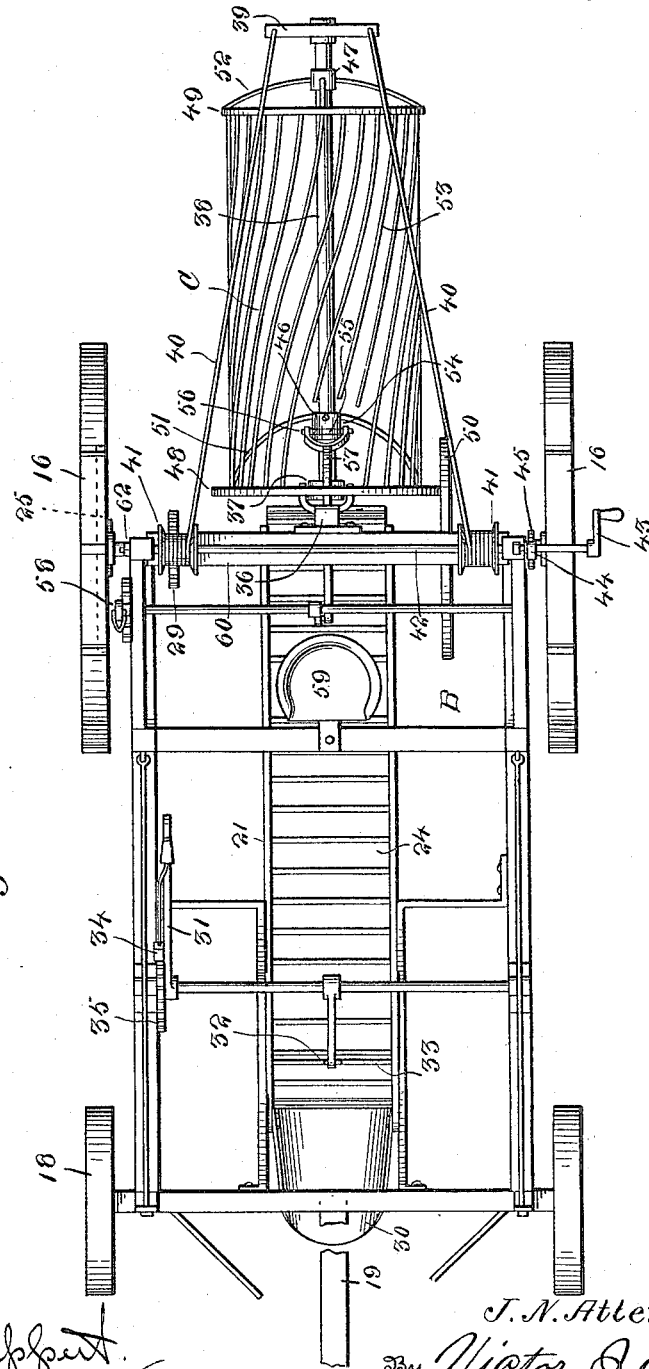
Witnesses
E. R. Ruppert
Wm. Dagger
Inventor
J. N. Atterbury
By Victor J. Evans
Attorney

J. N. ATTERBURY.
POTATO SEPARATOR.
APPLICATION FILED AUG. 22, 1914.

1,226,441.

Patented May 15, 1917.
3 SHEETS—SHEET 2.

Witnesses
E. R. Ruppert
Wm. Dagger

Inventor
J. N. Atterbury
By Victor J. Evans
Attorney

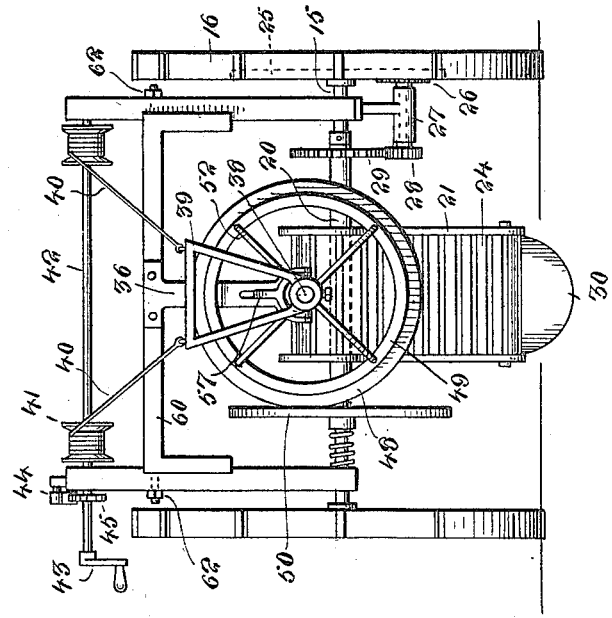

UNITED STATES PATENT OFFICE.

JOHN N. ATTERBURY, OF LAUREL, OREGON.

POTATO-SEPARATOR.

1,226,441.

Specification of Letters Patent.

Patented May 15, 1917.

Application filed August 22, 1914. Serial No. 858,086.

*To all whom it may concern:*

Be it known that I, JOHN N. ATTERBURY, a citizen of the United States, residing at Laurel, in the county of Washington and State of Oregon, have invented new and useful Improvements in Potato-Separators, of which the following is a specification.

This invention relates to that class of machines which are generally known as potato diggers and which are used for digging potatoes and like roots, separating the same from the adhering dirt and depositing them conveniently for subsequent gathering.

The present invention, while relating to an organized machine for the purpose set forth has particular reference to the means for cleaning and separating the potatoes, and has for its object to simplify and improve the means for that purpose.

A further object of the invention is to produce a rotary separating device in the nature of a drum occupied by a moving part of the machine, said drum consisting of a cage which during the passage of the potatoes therethrough will cause the dirt to become detached, the clean potatoes being delivered at the discharge end of the drum.

A further object of the invention is to simplify and improve the construction and operation of said drum or cage as well as the means for adjustably supporting the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Figure 1 is a top plan view of a machine constructed in accordance with the invention.

Fig. 2 is a side elevation, partly in section.

Fig. 3 is a transverse sectional view taken on the line 3—3 in Fig. 2.

Fig. 4 is a rear elevation.

Corresponding parts in the several figures are denoted by like characters of reference.

Figure 6:
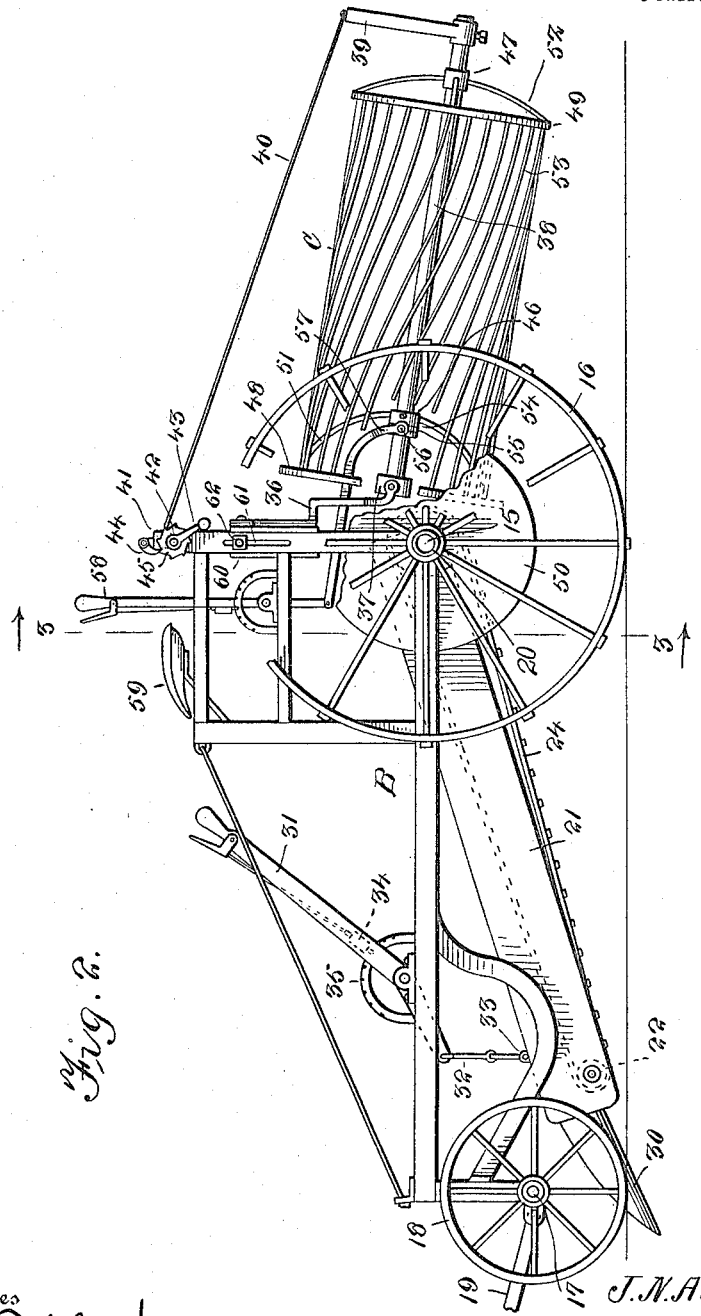

The frame B of the improved machine is supported near its rear end on the main axle 15 which is equipped with ground wheels 16. The forward part of the frame is supported on a truck including a front axle 17, wheels 18 and a tongue 19, the detailed construction of the truck being not specifically shown or claimed.

Mounted on the axle 15 is a sleeve 20 on which is pivotally supported the rearward end of a frame 21 carrying at its forward end a drum 22. The sleeve 20 carries a similar drum or reel 23, and an endless conveyer 24 is trained over the drums 22, 23, said conveyer being driven by power derived from one of the ground wheels which is equipped with an internal gear 25 meshing with a pinion 26 on one end of a shaft 27, the other end of which carries a pinion 28 meshing with a spur wheel 29 on the sleeve 20, which latter is thus driven to actuate the conveyer 24 in the proper direction. The frame 21 carries at its front end a digger 30 of suitable construction to excavate the potatoes which, being lifted by said digger, will be deposited on the conveyer 24 and thereby carried in a rearward direction. An adjusting lever 31 fulcrumed on the frame has a forwardly extending arm which is connected by a link 32 with a cross bar 33 of the conveyer frame 21, thus enabling the forward end of the latter, together with the digger 30, to be adjusted vertically and to be secured at various adjustments by means of a stop member 34 associated with the lever and engaging a rack segment 35.

The frame structure of the machine supports a rearwardly extending bracket 36 which is terminally bifurcated and which supports a pivoted sleeve 37 wherein rests the forward end of the frame bar 38, preferably of circular cross section, and having at its rearward end an upturned arm 39 connected by a flexible connection 40 with a drum 41 on a shaft 42 supported on the frame structure of the machine and having a crank 43, whereby it may be operated to wind the element 40, pawl and ratchet means 44, 45 being provided to prevent reverse rotation of the drum carrying shaft. The circular bar 38 supports a revolving drum or cage C having front and rear hubs 46, 47 that rotate on the bar or shaft 38, said hubs being provided with dished spokes supporting the rims 48, 49; the forward rim constituting a friction rim adapted to engage a friction disk 50 which is mounted on the axle 15 for rotation therewith. The spokes 51, 52 that support the rims 48, 49 are dished rearwardly; the spokes 51 supporting the friction rim 48 being especially dished to such an extent that material discharged over the conveyer 24 will readily pass into the drum C. The side walls of the latter are formed of bars 53 spirally arranged to connect the rims 48, 49 together.

The hub 46 at the forward end of the cage C has an annular groove 54 in which is fitted a ring 55 having diametrically opposite fingers 56 that pivotally engage the limbs of a bifurcated connecting bar 57, the forward end of said connecting bar being pivotally connected with an adjusting lever 58 which is supported on the frame structure of the machine within convenient reach of the driver or operator for whom a seat 59 is provided. It will be seen that by means of said adjusting lever the drum or cage C may be moved longitudinally of the shaft or bar 38, being thereby variously spaced from the center of the friction disk 50 and thus enabling the speed of rotation of the drum or cage to be easily regulated.

The bracket 36 that supports the forward end of the shaft or bar 38 is vertically adjustable with respect to the frame structure of the machine, the parts 60 of said frame structure with which the bracket is connected being provided with vertical slots 61 for the passage of connecting members, such as bolts 62.

From the foregoing description, taken in connection with the drawings hereto annexed, the operation and advantages of this invention will be readily understood. The potatoes being dug or excavated by the digger 30 will be carried by the conveyer 24 to the rotary drum or cage C, being discharged into the front end of the latter. The drum or cage occupies a downwardly and rearwardly inclined or tilted position, and due to this position, as well as the spiral disposition of the bars constituting the side walls of the cage, the potatoes will pass rearwardly therethrough and be discharged at the rear end on the ground, or if preferred into some receptacle provided for the purpose.

It is evident that the machine structure herein described is capable of variations and modifications within the scope of the appended claims. Thus, other means than the friction means herein described might be utilized for rotating the drum or cage, and other details may be varied without departing from the spirit of the invention.

Having thus described the invention, what is claimed as new, is:—

1. In a machine of the class described, a wheel supported carrying frame having a revolving axle, a friction disk on the axle, a tiltably supported shaft, a drum cage mounted slidably and rotatably on said shaft and having a friction rim in constant engagement with the friction disk, and means for effecting longitudinal adjustment of the drum cage on the shaft to vary the point of engagement of the friction rim with the friction disk, thereby varying the speed of rotation of the drum cage.

2. In a machine of the class described, a wheel supported carrying frame having a revolving axle, a friction disk on said axle, a pivotally supported tiltable shaft member, means for tilting said shaft member about the axis of its pivotal support and for sustaining it in adjusted position, a drum cage loosely mounted for rotation on the tiltable shaft member, said drum cage having a friction rim in constant engagement with the friction disk, and means for sliding the drum cage longitudinally of the shaft member.

In testimony whereof I affix my signature in presence of two witnesses.

JOHN N. ATTERBURY.

Witnesses:
JAS. D. FINNIGAN,
LEO A. HARMS.

Copies of this patent may be obtained for five cents each, by addressing the "Commissioner of Patents, Washington, D. C."